United States Patent
Anthony, Jr. et al.

(10) Patent No.: US 9,560,557 B2
(45) Date of Patent: Jan. 31, 2017

(54) MOBILITY MANAGEMENT OF OSI CONNECTIONS BETWEEN CELL TOWERS

(71) Applicant: International Business Machines Corporation, Armonk, NY (US)

(72) Inventors: Bruce O. Anthony, Jr., Pine Island, MN (US); Ronald L. Billau, Rochester, MN (US); Chatschik Bisdikian, Chappaqua, NY (US); Canio Cillis, Berlin (DE); Victor S. Moore, Gainsville, FL (US); Erich M. Nahum, New York, NY (US); Robert B. Nicholson, Portsmouth (GB); Colin J. Thorne, Southampton (GB); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/203,992

(22) Filed: Jul. 7, 2016

(65) Prior Publication Data

US 2016/0316400 A1    Oct. 27, 2016

Related U.S. Application Data

(63) Continuation of application No. 13/733,714, filed on Jan. 3, 2013, now Pat. No. 9,451,504.

(30) Foreign Application Priority Data

Jan. 4, 2012    (GB) .................................. 1200071.7

(51) Int. Cl.
*H04W 36/00*    (2009.01)
*H04L 29/12*    (2006.01)
(Continued)

(52) U.S. Cl.
CPC ...... *H04W 36/0027* (2013.01); *H04L 61/2007* (2013.01); *H04L 61/2528* (2013.01); *H04L 67/2842* (2013.01); *H04W 8/26* (2013.01)

(58) Field of Classification Search
CPC .................................................. H04W 36/0027
See application file for complete search history.

(56) References Cited

U.S. PATENT DOCUMENTS 5,570,359 A    10/1996   Nguyen
8,817,643 B1    8/2014   Sun et al.
(Continued)

FOREIGN PATENT DOCUMENTS

EP    2337394 A2    6/2011
WO    2005008964 A1    1/2005
(Continued)

OTHER PUBLICATIONS

Hannah Sylvester, Search Report for Application GB1200071.7, May 17, 2012, United Kingdom Intellectual Property Office, pp. 1-3.
(Continued)

*Primary Examiner* — Robert M Morlan
*Assistant Examiner* — Kevin Lee
(74) *Attorney, Agent, or Firm* — Law Office of Jim Boice

(57) ABSTRACT

A processor-implemented method, apparatus, and/or computer program product move Open Systems Interconnection (OSI) layer 4 connections between wirelessly-connected user equipment to a series of cell-towers, wherein an OSI layer 4 connection is extracted out of the underlying cellular protocols at the series of cell-towers. A detection is made that user equipment, which has a broken-out layer 4 connection, has moved from a first cell-tower to a second cell-tower. Traffic for an existing layer 4 connection from the user equipment is tunnelled between the first cell-tower and (Continued)

the second cell-tower. In response to a predetermined trigger event occurring, an ongoing bidirectional flow of data packets is migrated from the user equipment over to layer 4 connections maintained at the second cell-tower. Furthermore, OSI layer 4 connections for all server ports other than the proxied active layer 4 connections that are proxied in the web cache are byte cached.

18 Claims, 6 Drawing Sheets

(51) Int. Cl.
*H04L 29/08* (2006.01)
*H04W 8/26* (2009.01)

(56) References Cited

U.S. PATENT DOCUMENTS

| | | |
|---|---|---|
| 2006/0245394 A1 | 11/2006 | Baba et al. |
| 2010/0167740 A1 | 7/2010 | Vakil et al. |
| 2010/0311421 A1 | 12/2010 | Mach |
| 2011/0149905 A1 | 6/2011 | Kim |
| 2011/0235595 A1 | 9/2011 | Mehta et al. |

FOREIGN PATENT DOCUMENTS

| | | | |
|---|---|---|---|
| WO | 2010034483 A1 | 4/2010 | |
| WO | 2010122511 A1 | 10/2010 | |
| WO | 2011063239 A1 | 5/2011 | |
| WO | 2011084820 A1 | 7/2011 | |

OTHER PUBLICATIONS

Stoke, Inc., "Mobile Edge Gateway", 2013, http://www.stoke.com/products/, 1 page.
Stoke, Inc., "Stoke Enhances Mobile Data Offload, Catalyzes New Ecosystem for Innovation at the Edge", Press Release, Santa Clara, CA, http://www.stoke.com/news/pr/2011/pr020911.asp, Feb. 9, 2011, 1 page.
Radisys News, "Continuous Computing Announces Internet Offload Reference Platform Using Latest Intel Xeon Processor 5600 Series", Press Release, San Diego, CA, Mar. 16, 2010, pp. 1-3.
Anonymous, "Squid: Optimising Web Delivery", http://www.squid-cache.org/, Retrieved Jan. 3, 2013, 1 Page.
A. Dutta, "Systems Optimization for Mobility Management" Columbia University, 2010, pp. 1-576.
A. Handa, "Mobile Data Offload for 3G Networks, a Whitepaper", Oct. 2009, Intellinet Technologies, pp. 1-7.
Y. Chen et al., "IP Connectivity for Gateway GPRS Support Node", IEEE Wireless Communications Feb. 2005, pp. 37-46.
U.S. Appl. No. 13/733,714 Notice of Allowance Mailed Jun. 7, 2016.
U.S. Appl. No. 13/733,714 Non-Final Office Action Mailed Nov. 19, 2015.
U.S. Appl. No. 13/733,714 Non-Final Office Action Mailed Apr. 9, 2015.

MOBILITY MANAGEMENT OF OSI CONNECTIONS BETWEEN CELL TOWERS

BACKGROUND

The present invention relates generally to the field of data stream delivery over wireless communication networks, and in particular, although not exclusively, to a scheme for providing mobility management for an optimization system for data traffic (mobile internet) in a mobile phone network.

Audio and video are two examples of suitable data streams, although the present invention is applicable to any protocol. By way of (non-limiting) example, the present invention may be utilized in the loading of a Web page using Hypertext Transfer Protocol (HTTP) or file transfers such as the download of software updates to a laptop device running a Windows-based operating system.

SUMMARY

A processor-implemented method, apparatus, and/or computer program product move Open Systems Interconnection (OSI) layer 4 connections between wirelessly-connected user equipment to a series of cell-towers in applications, wherein an OSI layer 4 connection is extracted out of the underlying cellular protocols at the series of cell-towers. A detection is made that user equipment, which has a broken-out layer 4 connection, has moved from a first cell-tower to a second cell-tower. Traffic for an existing layer 4 connection from the user equipment is tunnelled between the first cell-tower and the second cell-tower, where tunneling the traffic includes first network address translation (NAT) means at the first cell-tower and second NAT means at a radio network controller (RNC) linking the first and second cell-towers to route IP packets to an appropriate cell-tower, where the second NAT means at the RNC map a first network address, used by data network servers for the user equipment, to a second network address, in the first NAT means, that is used by the first and second cell-towers. A predetermined trigger event is identified, where the predetermined trigger event is a forced termination of any active layer 4 connections proxied at the first cell-tower, where proxied active layer 4 connections are proxied in a web cache within a transparent forward proxy in the first cell-tower. In response to the predetermined event occurring, an ongoing bidirectional flow of data packets is migrated from the user equipment over to layer 4 connections maintained at the second cell-tower. Furthermore, OSI layer 4 connections for all server ports other than the proxied active layer 4 connections that are proxied in the web cache are byte cached by the one or more processors.

DETAILED DESCRIPTION

Figure 1:
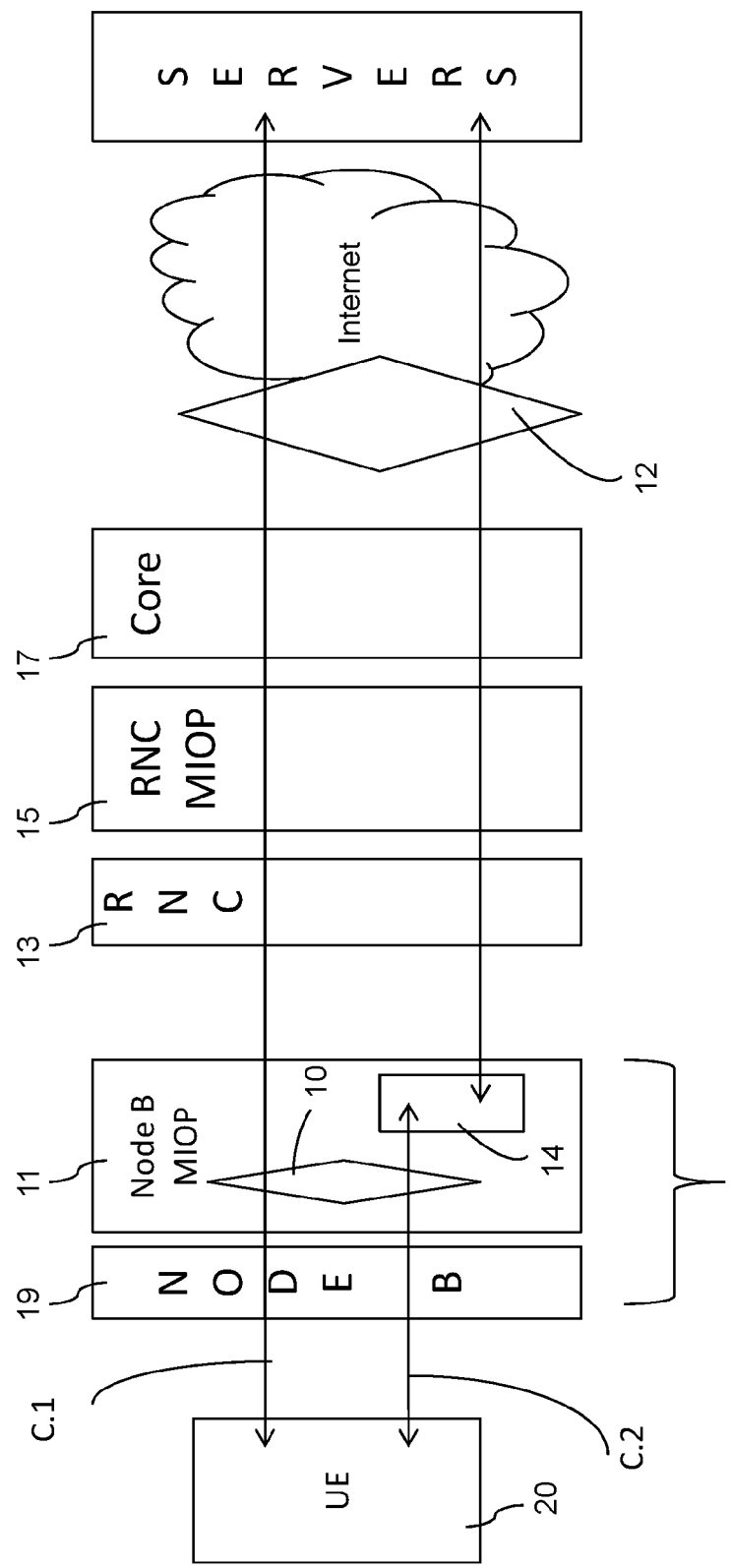
FIG. 1 schematically represents layer 4 (specifically TCP) connections in an MIOP architecture.

Considering initially the architecture of a 3rd Generation (3G) Mobile Phone Network, following UMTS (the Unified Mobile Telephony System), the UMTS architecture is standardised by the 3rd Generation Partnership Project (3GPP) and comprises a number of discrete interconnected entities as represented in FIG. 1 of the accompanying drawings. At the user level, a wireless device (such as a Cellphone, 3G dongle for a laptop, tablet device etc.) is known in 3GPP terminology as a User Equipment (UE 20). It connects wirelessly to the cell tower which is labelled BS (Base Station) and is also known as a NodeB 19 in 3GPP terminology: in a typical arrangement, around 100 cell towers (NodeBs) may be connected over microwave or optical fibre links to a Radio Network Controller (RNC) 13 which is connected via a core network 17 arrangement to the Internet. The core network 17 includes at least one serving GPRS support node (SGSN) which supports several RNCs. The SGSN is connected to a gateway GPRS support node (GGSN). Finally the GGSN is connected back to the operator service network OSN (also termed the "Gi" reference point in the 3GPP terminology) which connects to the Internet at a Peering Point.

Figure 2:
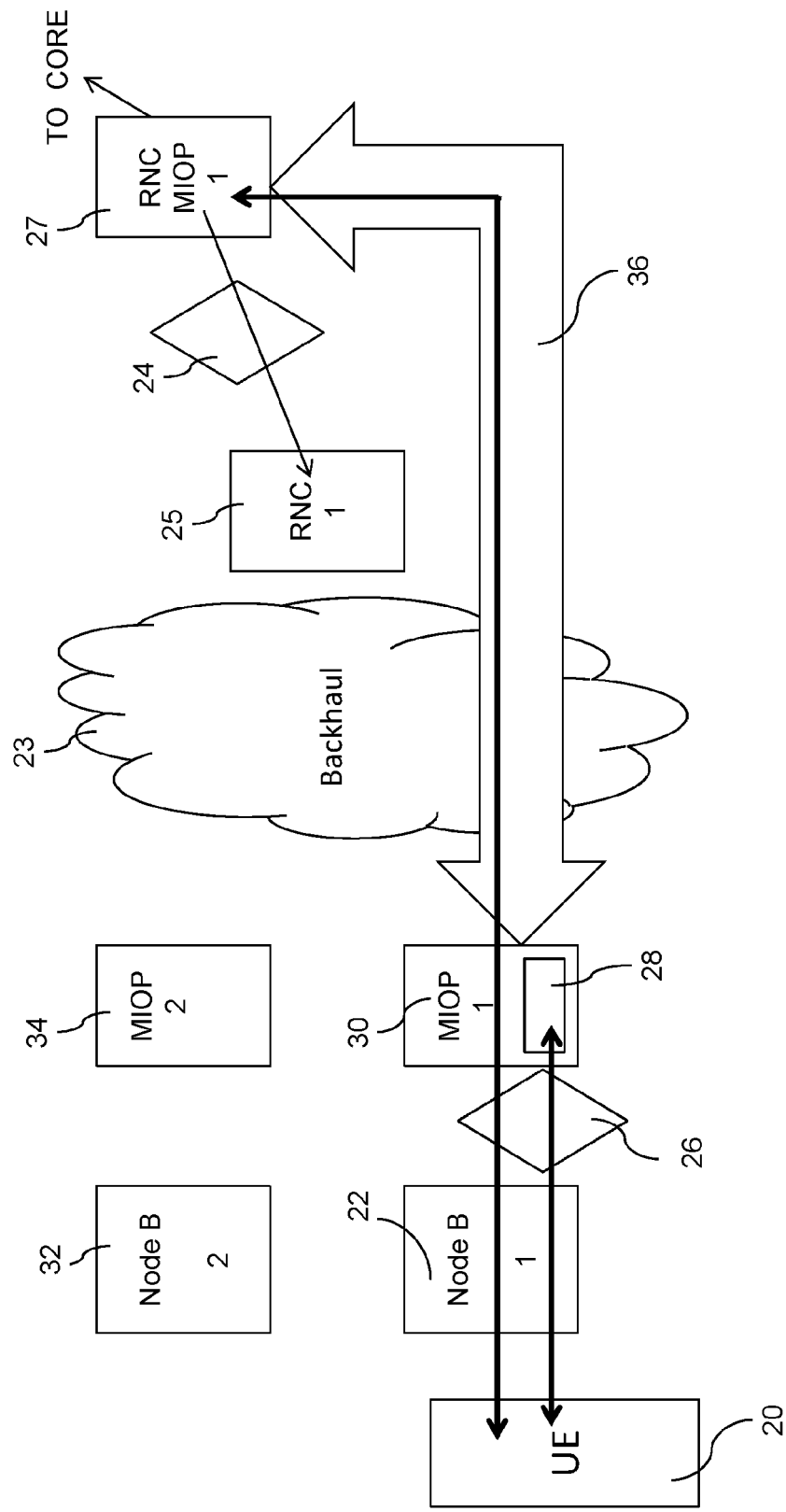
FIGS. 2-5 schematically represent sequential stages in the ongoing handover of messages from an originator to a destination.

The messaging protocols between the entities from the UE 20 back (via backhaul 23, as shown in FIG. 2) to the GGSN are various 3GPP specific protocols over which the IP traffic from the UE 20 is tunneled. Between the GGSN, OSN and Internet, standard Internet Protocol (IP) is used.

In order to understand the invention it will be useful first to consider the optimization system to which it relates. The density of mobile computing platforms is increasing at an exponential rate. Mobile computing platforms include traditional platforms such as phones, tablets and mobile broadband enabled laptops but increasingly also mobile data enabled devices such as GPS systems, cars, and even mobile medical equipment. Each of these may be considered a User Equipment (UE) 20 in the arrangement of FIG. 1. This exponential increase in density brings significant new challenges for Mobile Network Operators (MNOs) as data becomes the majority of the content they deliver.

One technique to address these challenges is to separate or 'break out' the data traffic from the mobile phone protocols and optimize it. Several companies now market devices designed to break data traffic out of the network. Each of these devices breaks traffic out of the 3GPP protocols at the RNC. Similar technology is emerging to break out the IP traffic at the cell tower.

Once the IP traffic has been broken out of the network, it is possible to put an optimization platform at the edge of the mobile phone network, either at the RNC 13 or in the cell tower (NodeB 19). This platform can host various optimizations and other applications. As an example, one optimization that can be run at the cell tower or the RNC 13 is a web cache. Specifically, this cache is a transparent forward proxy with a cache. Such caches are well known and have a range of uses in caching and filtering applications.

In order to understand the invention it will additionally be useful to consider how Mobility Management works in UMTS. A key process in the support of Mobility Management is the use of tunnelling protocols wherein a delivery protocol encapsulates a separate (payload) protocol to provide a secured path through a network. In the UMTS system, this is implemented by the making of a tunnel from the GGSN to the user equipment (UE). Designers of such systems will usually include Network Address Translation (NAT)—along with mechanisms to support the same—in their design such that multiple UEs will share the same internet-facing IP address. The utilization of NAT will be described in greater detail below: operational means or apparatus stages for implementing NAT are represented in the accompanying drawings by a diamond shape, including NAT means 10 and 12 shown in FIG. 1.

As the UE 20 begins to move from one cell to the next, accessing successive NodeBs, the RNC (Radio Network Controller) 13 and GSNs (serving and gateway GPRS Support Nodes) within the core network 17 work together to move the tunnel as the UE 20 moves from one cell tower to another. A key point to recognise is that the UMTS system maintains the integrity of the tunnel across the mobility event. Referring to the Open Systems Interconnection (OSI) model of computer networking, in the transport layer (Layer 4) protocols, the Layer 4 protocols flowing through the tunnel are not affected. It is possible that one or more IP packets may be dropped during the mobility event but Layer 4 protocols such as TCP can operate over lossy links and such packet drop can be easily recovered. As the UE 20 continues to move, into an area served by a new RNC, the tunnel is handed off seamlessly from one RNC to another.

As will be readily understood, referring to the OSI model, IP is a Layer 3 protocol over which the known transport control protocol (TCP) flows at Layer 4. Other known Layer 4 protocols include UDP and SCTP and the invention is equally applicable to them.

Considering now Mobile Internet Optimization Platforms (abbreviated herein and in the drawings to MIOP), where referencing an MIOP in a cell tower it will be referred to below as an MIOP@NodeB (Node B MIOP 11) and where referencing an MIOP at an RNC 13 it will be referred to below as an MIOP@RNC (RNC MIOP 15). The arrangement of Layer 4 connections (especially TCP connections) in an MIOP architecture is illustrated in FIG. 1 of the accompanying drawings.

The MIOP appliances may have a range of optimizations in them. For the purposes of illustrating the present invention, the applicants will concentrate on just two optimizations, those of an HTTP Proxy Cache and a Byte cache. Considering the Layer 4 connections in a system employing a Forward Proxy 14 in a cell tower BS it can be seen that unproxied traffic, illustrated as case C.1 in FIG. 1, passes straight through the system whereas proxied connections are terminated in the cell tower. This is case C.2 in the Figure and, for the purposes of illustration, it will be considered that only traffic for HTTP port 80 is proxied.

Layer 4 connections for all server ports other than HTTP port 80 are not proxied. The Layer 4 connections are not proxied but it will be assumed that they are subject to Byte Caching between the NodeB 19 and RNC 13.

Considering how these connections flow through the network it will be recognized that, for broken out traffic, they bypass the UMTS mobility enabled channels, using an overlay network to connect back to the Gi or Operator Service Network.

Figure 3:
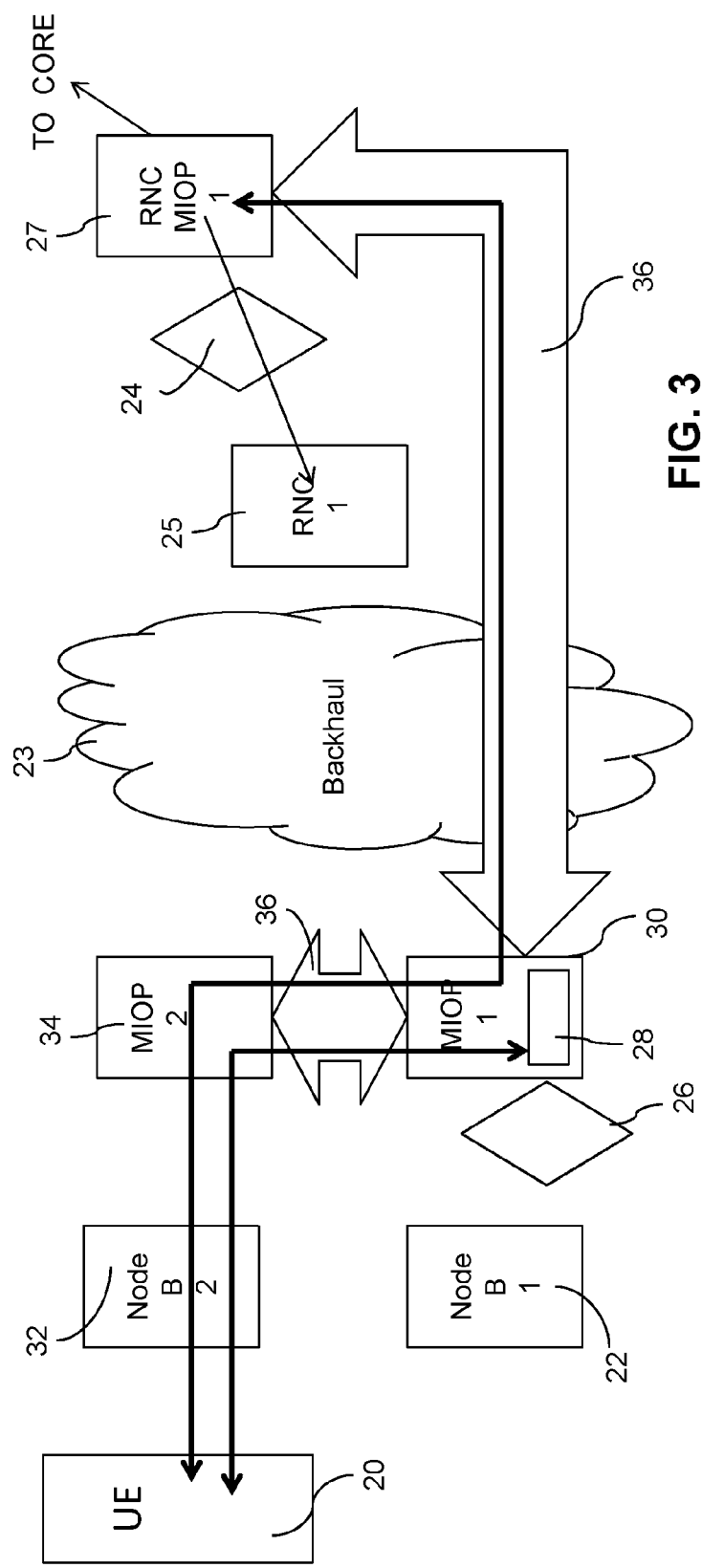

Routing of packets between the MIOP@NodeB and the Gi occurs using the system of Network Address Translation (NAT) referenced above. At the cell tower, the IP address of the UE 20 is translated into a private IP address that is in a NAT pool belonging to this MIOP@NodeB. The addresses in this NAT pool are routed to this MIOP@NodeB in this particular cell tower. When the UE 20 moves to the cell tower served by another NodeB 2 (as shown in FIG. 3), it will be understood that with current arrangements the layer 4 connections are broken because packets being routed back from the Gi are sent to the wrong MIOP.

The Architecture presented thus far is able to optimize Data traffic in the UMTS network but it is unable to provide Mobility Management for such traffic.

It is therefore an object of the present invention to provide a means to enable mobility management in a system supporting the MIOP optimizations.

As indicated above, it is an aim of the present invention to solve the problem of how to provide Mobility Management with MIOP optimization. In the following description of embodiments of the invention, in order to solve this problem, one or more of the following three specific additions to the MIOP design are made. Separately or together these additions allow traffic to a UE to benefit from MIOP optimization whilst the UE moves from cell tower to cell tower.

1. Cascaded, Synchronised NAT:

In a practical realization, another NAT is introduced at the RNC 23. This NAT 10 is managed together with the NAT 10 in the MIOP@NodeB during the mobility management scheme to route IP packets to the appropriate MIOP@NodeB, preserving TCP connections to the UE 20.

2. Traffic Forwarding:

MIOP@NodeBs are able to forward traffic between cell towers. As will be described in further detail below, the resulting MIOP overlay network, by means of which data broken out of UMTS may be passed from one NodeB to another, is a key requirement to support MIOP mobility management.

3. TCP Connection Monitoring and Management:

MIOP Mobility events are preferentially achieved when there are no active TCP connections proxied in the MIOP@NodeB, that is to say when quiescence occurs at the first NodeB 19. Use may be made of the expected robustness of the connection, whereby it is expected that some packets may be dropped and re-sent: optionally, rather than waiting for a quiescence event to occur, such connections may be monitored and, rather than awaiting quiescence, aggressively terminated to facilitate mobility.

In order to illustrate the Mobility Management scheme, the operation of the system is presented as a set of steps in FIG. 2-FIG. 5 of the accompanying drawings, starting with FIG. 2 which shows the UE 20 wirelessly connected to a first BS (NodeB) 22. In a difference to the conventional arrangement, another NAT 24 is introduced at the RNC 25 and the MIOP@RNC (RNC MIOP1 27), in addition to the NAT 26 at the NodeB 22. The IP address seen by the operator at the core level (FIG. 1) is an address in the RNC NAT's (24's) address pool (group of transferable addresses available for assignment by a NAT). The RNC-NAT 24 maps between this address and the address used by the NodeB-NAT 26.

Initially the UE 20 is attached to the network at NodeB 22: it can be seen that there are proxied TCP connections (proxy/proxy code) 28 so there is a TCP state in the MIOP@NodeB (MIOP1) 30.

Referring next to FIG. 3, immediately after the UE 20 moves to another cell tower represented by NodeB 32, the MIOP@NodeB (MIOP2 34) will begin breaking out the data traffic for the UE 20. Because there are still TCP connections between the UE 20 and the proxy 28 in MIOP@NodeB (MIOP1 30), data traffic is forwarded between MIOP1 30 and MIOP2 34, using a TCP proxy 28. This forwarding makes use of an overlay network 36 between the cell towers. This is provided either over the transport network between the cell towers or by routing traffic via the core.

This re-routing may sound inefficient but, as will become apparent, the loading occurs only for a short time and only for UEs which experience Mobility with open, active proxied data connections—generally a small percentage of the population at any given time.

At this transitional stage, the MIOP@NodeB 30 monitors the TCP connections for the UE 20. This monitoring may take place in the proxy code 28 itself or simply in a firewall-like layer in the IP stack which monitors the TCP protocol looking at the TCP flags.

In order to determine when to handover communications, the system is set to watch for a point where layer 4 TCP or other communications cease—that is to say specifically enter the 'Closed' state, either as a naturally occurring hiatus in communications (referred to as quiescence) or through a forced termination in the original MIOP. This is the trigger to move to the next step.

Figure 4:
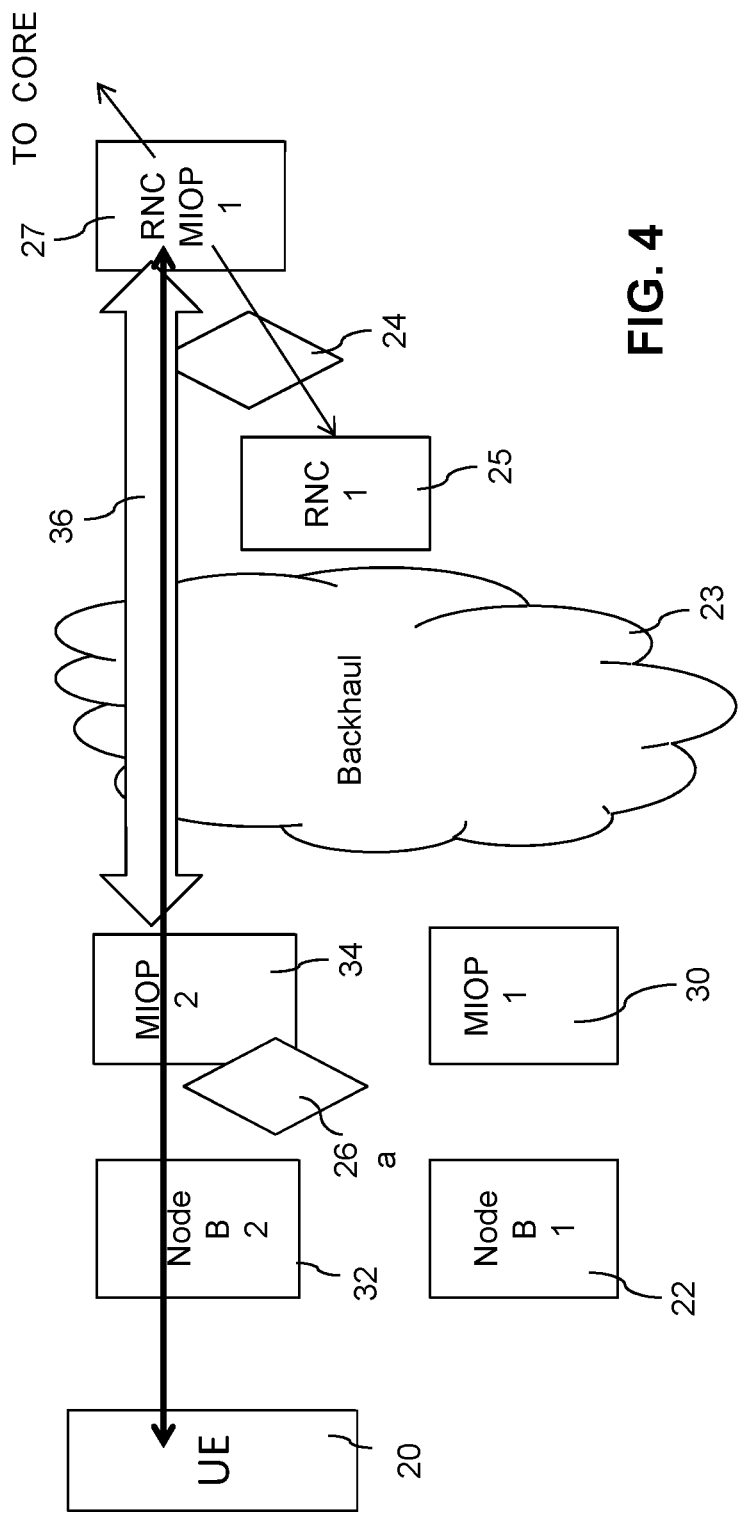

Turning now to FIG. 4, once it has been detected that Layer 4 connections terminated in MIOP1 30 have quiesced (either naturally or through forced closure), the NAT 26a in the NodeB 22 and at the NAT 24 at the RNC1 25 are adjusted in a synchronised manner so that the UE 20 is given a new IP address which is associated with MIOP@NodeB 34 and traffic for this UE 20 is routed to MIOP 34 by the NAT 24 at the RNC. Specifically, the NAT@RNC 24 is adjusted so that the IP address seen by the Gi for this UE 20 is maintained but it is mapped to the new IP address used by the NAT 26A in MIOP@NodeB 34 for this UE. Determining the quiescing of connections in MIOP1 30 can be done by keeping track of the connection status, either in the Operating System kernel, or by another monitoring entity observing Layer 4 connection initiation and termination flags.

Figure 5:
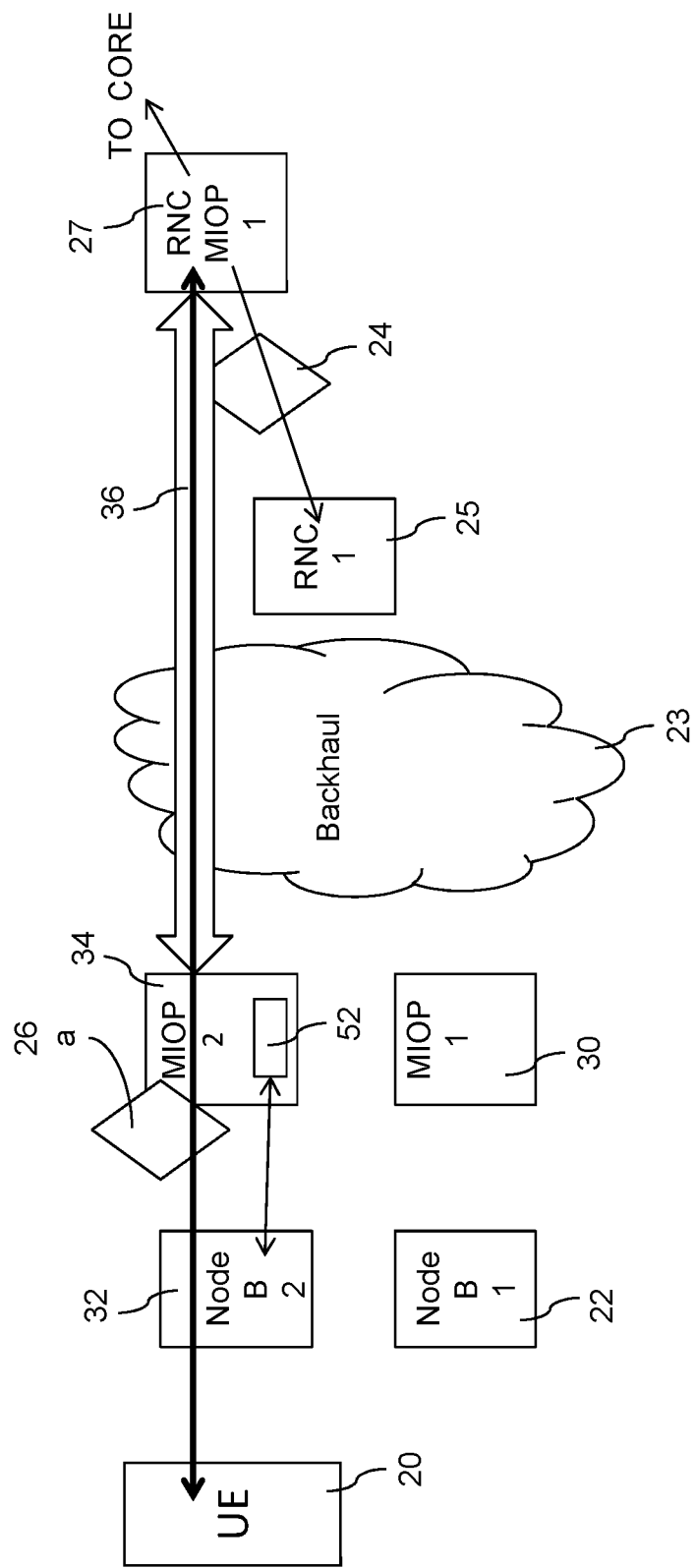

Referencing FIG. 5, following natural or forced quiescence at MIOP1 30, the UE 20 is fully transferred to the new cell tower and may now begin creating new HTTP connections which are proxied 52 at MIOP@NodeB 34.

Going forward, the UE 20 may continue to move between cells covered by the same RNC. In this case the handover process described above repeats itself.

Where the UE moves to a cell covered by a different RNC, linked to the original via the core network 17, there are several options that may be applied. In a preferred arrangement, traffic can be forwarded from the original RNC to a new RNC for the duration of the session. The network between RNCs usually has a high bandwidth and low latency. In an alternate arrangement, another NAT can be included further back in the Gi (core; FIG. 1) to provide a further level of controlled redirection to allow traffic from the Gi to be routed to a new RNC.

Figure 6:
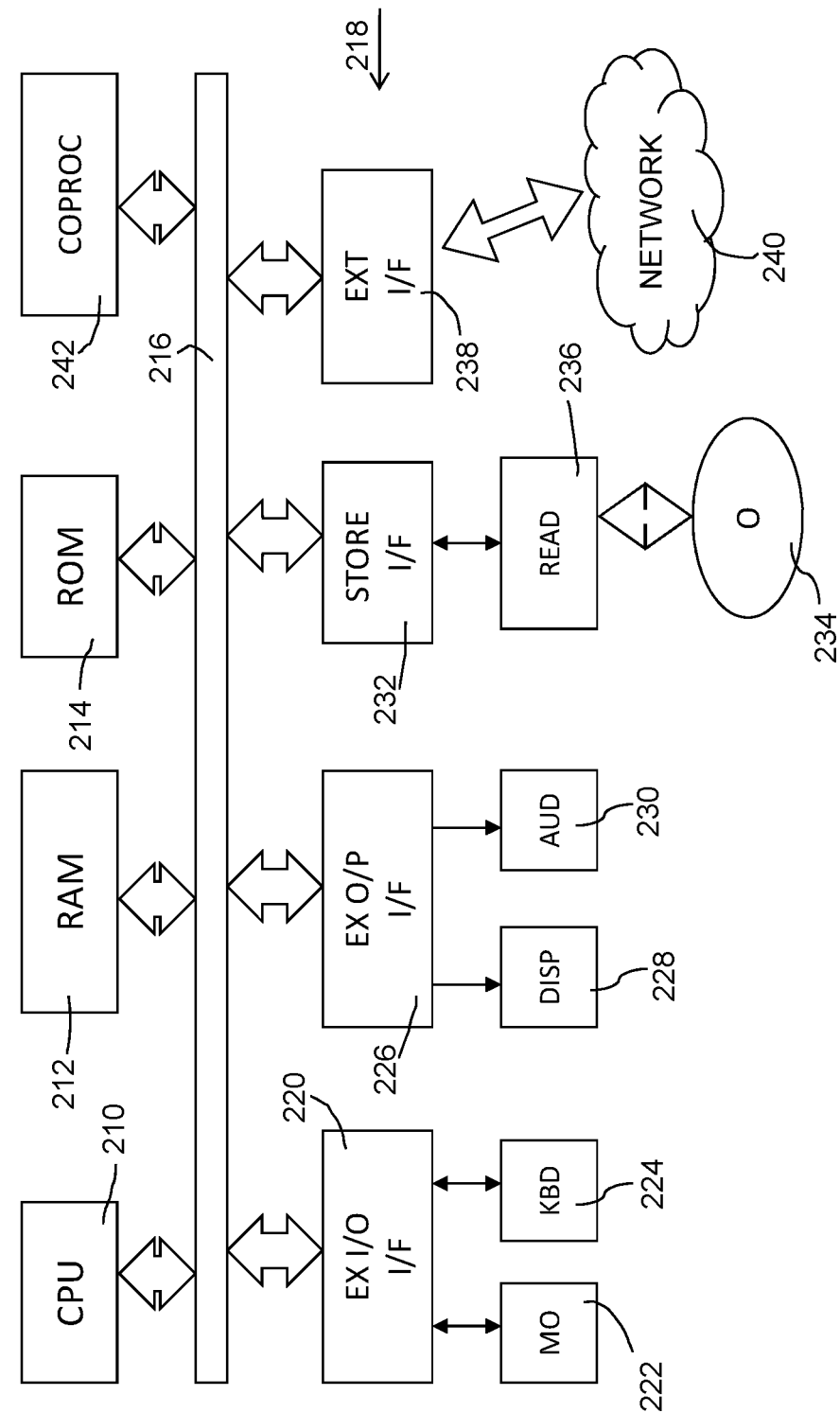
FIG. 6 schematically represents the components of a personal data processing machine embodying the present invention.

In terms of applicable hardware, FIG. 6 schematically represents the components of a computer system suitable to embody aspects of the present invention, particularly the UE 20 and/or NodeB 22 (with associated MIOP 30) excluding the wireless communications mechanisms which may be conventional in form.

A first processor CPU 210 is coupled with random access memory RAM 212 and read only memory ROM 214 by an address and data bus 216. As will be understood, CPU 210 may comprise a cluster of processors (nodes) with individual processes and/or process threads being handled by individual nodes. Also connected to CPU 210 via the address and data bus 216 is at least one further processor 242 (or cluster of nodes), which may be a further CPU sharing tasks with the first CPU 210, or may be a coprocessor device supplementing the function of the CPU 210, handling processes such as floating point arithmetic, signal processing and encryption. Each of these internal hardware devices 210, 212, 214, 242 includes a respective interface (not shown) supporting connection to the bus 216. These interfaces are conventional in form and need not be described in further detail.

Also connected to the CPU 210 via bus 216 are a number of external hardware device interface stages (generally denoted 218). A first interface stage 220 supports the connection of external input/output devices, such as a mouse 222 and/or keyboard 224. A second interface stage 226 supports the connection of external output devices such as a display screen 228 and/or audio output device 230, such as headphones or speakers. A third interface stage 232 supports the connection to external data storage devices in the form of computer readable media: such external storage may as shown be provided by a removable optical or magnetic disc 234 (accessed by a suitably configured disc reader 236). Alternatively or additionally the external storage may be in the form of a solid state memory device such as an extension drive or memory stick. The external storage may contain a computer program, containing program software code portions which, when run by the CPU 210 and/or further processor 242, perform the method according to the present invention.

A fourth interface stage 238 supports connection of the system to remote devices or systems via wired or wireless networks 240, for example over a local area network LAN, via the internet, or another cloud computing source.

In the foregoing, the applicants have described a method for moving OSI layer 4 connections (such as TCP) seamlessly between wireless User Equipments (UE) connected to a series of cell towers in applications where the connection is extracted out of the underlying cellular protocols at the towers. On detecting that a UE with a broken-out connection has moved from a first to a second cell tower, traffic for an existing connection from the UE is tunnelled between the first cell-tower and the second cell-tower. On identifying a predetermined trigger event, which may be natural or forced quiescence at the terminal, an ongoing message exchange is migrated to the second cell-tower on occurrence of the trigger event.

In accordance with a first aspect of the present invention there is provided a method for moving Open Systems Interconnection (OSI) Layer 4 protocol connections seamlessly between a User Equipment connected wirelessly to a series of cell-towers in applications where said layer 4 connection is extracted out of the underlying cellular protocols at said towers, comprising the steps of: detecting that said User Equipment with a broken-out layer 4 connection has moved from a first cell-tower to a second cell-tower; tunneling traffic for an existing layer 4 connection from the User Equipment between the first cell-tower and the second cell-tower; identifying a predetermined trigger event; and migrating an ongoing bidirectional flow of data packets from the User Equipment over to layer 4 connections maintained at the second cell-tower on occurrence of the trigger event. In this way, the MIOP optimizations may be maintained whilst mobility management is maintained. The OSI layer 4 model communications may suitably comprise the known transport control protocol (TCP) or may comprise UDP or SCTP.

The step of tunnelling traffic may comprise setting up a tunnelling protocol between two base stations and redirecting the traffic into a tunnel. As will be recognized, tunnelling is not preferred as a permanent strategy as it is wont to add latency which, if accumulated through a sequence of handovers from cell tower to cell tower would lead to an unwieldy chain. Furthermore, constraints may be encountered as the available bandwidth for a tunnel link may be restricted. In one such a scenario, following the trigger event, to implement the tunnelling, the first and second NAT means may be adjusted in synchronism, suitably to provide the User Equipment with a new IP address associated with the second cell-tower, with tunnelling of traffic optimally using an overlay network defined between the cell towers.

Handover is preferably handled when there is no traffic (quiescence), so the predetermined trigger event may be the detection of there being no active layer 4 connections proxied at the first cell-tower (that is to say quiescence at the first cell-tower). Managing a handover whilst there are active TCP or other layer 4 connections proxied in the cell tower would result in these connections being broken. Such a break would be seen by the UE and would usually impact the user, such as by stopping the play of a video, ending a video chat session, or terminating the load of a web page.

In an alternative strategy, the potential impacts on the user may be deemed acceptable, and the predetermined trigger event may be the forced termination of any active TCP connections proxied at the first cell tower.

Also in accordance with the present invention there is provided a communications apparatus comprising: a plurality of interconnected cell-towers wirelessly connectable to a portable User Equipment, each such cell-tower being operable to extract a transport control protocol (TCP) connection from an underlying cellular protocol, the apparatus further comprising control means operable to: detect that a User Equipment with a broken-out TCP connection has moved from wireless connection with a first cell-tower to wireless connection with a second cell-tower; tunnel traffic for an existing TCP connection from the User Equipment between the first cell-tower and the second cell-tower; identify a predetermined trigger event; and migrate an application request from the User Equipment over to TCP connections maintained at the second cell-tower on occurrence of the trigger event.

The apparatus may further comprise first NAT means at the first cell-tower and second NAT means at an RNC linking said first and second cell-towers, the control means being coupled with the NAT means to route IP packets to the appropriate cell-tower. In such a case, the control means may be arranged to, following the trigger event, adjust the first and second NAT means in synchronism, suitably to adjust the NAT means to provide the User Equipment with a new IP address associated with the second cell-tower.

The control means may be configured to identify the predetermined trigger event through the detection of there being no active TCP connections proxied at the first cell-tower, or it may be configured to create the predetermined trigger event by the forced termination of any active TCP connections proxied at the first cell-tower.

The invention further provides a computer program stored on a non-transitory computer readable medium and loadable into the internal memory of a digital computer, comprising software code portions, when said program is run on a computer, for performing the method according to the invention and as described above.

The summary of the present invention does not recite all the necessary features of the invention, and sub-combinations of those features may also encompass the invention.

While embodiments of the present invention have been described above, the technical scope of the invention is not limited to the scope of the above-described embodiments. It should be apparent to those skilled in the art that various changes or improvements can be made to the embodiments. It is apparent from the description of the appended claims that implementations including such changes or improvements are encompassed in the technical scope of the invention.

The invention claimed is:

1. A processor-implemented method for moving Open Systems Interconnection (OSI) layer 4 connections seamlessly between a user equipment connected wirelessly to a series of cell-towers, wherein the OSI layer 4 connections are moved between the user equipment and a first cell-tower from the series of cell-towers to the user equipment and a second cell-tower from the series of cell-towers, wherein an OSI layer 4 connection is extracted out of underlying cellular protocols at said cell-towers, and wherein the processor-implemented method comprises:

detecting, by one or more processors, that said user equipment has a broken-out layer 4 connection;

detecting, by the one or more processors, that said user equipment, with the broken-out layer 4 connection, has moved from the first cell-tower to the second cell-tower;

tunnelling, by the one or more processors, traffic for an existing layer 4 connection from the user equipment between the first cell-tower and the second cell-tower, wherein tunnelling traffic comprises first network address translation (NAT) means at the first cell-tower and second NAT means at a radio network controller (RNC) linking said first and second cell-towers to route IP packets to an appropriate cell-tower, wherein the second NAT means at the RNC map a first network address, used by data network servers for the user equipment, to a second network address, in the first NAT means, that is used by the first and second cell-towers;

identifying, by the one or more processors, a predetermined trigger event, wherein the predetermined trigger event is a forced termination of any active layer 4 connections proxied at the first cell-tower, wherein proxied active layer 4 connections are proxied in a web cache within a transparent forward proxy in the first cell-tower;

in response to the predetermined trigger event occurring, migrating, by the one or more processors, an ongoing bidirectional flow of data packets from the user equipment over to layer 4 connections maintained at the second cell-tower; and byte caching, by the one or more processors, OSI layer 4 connections for all server ports other than the proxied active layer 4 connections that are proxied in the web cache.

2. The processor-implemented method of claim 1, wherein only traffic for hypertext transfer protocol (HTTP) port 80 is proxied.

3. The processor-implemented method of claim 1, wherein, following the predetermined trigger event, the first and second NAT means are adjusted in synchronism.

4. The processor-implemented method of claim 3, wherein the first and second NAT means are adjusted to provide the user equipment with a new IP address associated with the second cell-tower.

5. The processor-implemented method of claim 1, wherein said tunnelling of the traffic uses an overlay network defined between the cell-towers.

6. The processor-implemented method of claim 1, wherein an OSI layer 4 protocol used in the OSI layer 4 connections comprises one of: Transmission Control Protocol (TCP), User Datagram Protocol (UDP), and Stream Control Transmission Protocol (SCTP).

7. A communications apparatus comprising:

a plurality of interconnected cell-towers wirelessly connectable to a portable user equipment, each such cell-tower being operable to extract an Open Systems Interconnection (OSI) layer 4 protocol connection from an underlying cellular protocol, the communications apparatus further comprising control means operable to:
- detect that said portable user equipment has a broken-out layer 4 connection;
- detect that said portable user equipment, with the broken-out layer 4 connection, has moved from a first cell-tower to a second cell-tower;
- tunnel traffic for an existing layer 4 connection from the portable user equipment between the first cell-tower and the second cell-tower, wherein tunnelling traffic comprises first network address translation (NAT) means at the first cell-tower and second NAT means at a radio network controller (RNC) linking said first and second cell-towers to route IP packets to an appropriate cell-tower, wherein the second NAT means at the RNC map a first network address, used by data network servers for the portable user equipment, to a second network address, in the first NAT means, that is used by the first and second cell-towers;
- identify a predetermined trigger event through a detection of there being no active layer 4 connections proxied at the first cell-tower, wherein proxied active layer 4 connections are proxied in a web cache within a transparent forward proxy in the first cell-tower;
- in response to the predetermined trigger event occurring, migrate an ongoing bidirectional flow of data packets from the user equipment over to layer 4 connections maintained at the second cell-tower; and
- byte cache OSI layer 4 connections for all server ports other than the proxied active layer 4 connections that are proxied in the web cache.

8. The communications apparatus of claim 7, wherein only traffic for hypertext transfer protocol (HTTP) port 80 is proxied.

9. The communications apparatus of claim 7, wherein the control means are arranged, following the predetermined trigger event, to adjust the first and second NAT means in synchronism.

10. The communications apparatus of claim 9, wherein the control means are arranged to adjust the first and second NAT means to provide the user equipment with a new IP address associated with the second cell-tower.

11. The communications apparatus of claim 7, wherein said tunnelling of the traffic uses an overlay network defined between the cell-towers.

12. The communications apparatus of claim 7, wherein an OSI layer 4 protocol used in the OSI layer 4 connections comprises one of: Transmission Control Protocol (TCP), User Datagram Protocol (UDP), and Stream Control Transmission Protocol (SCTP).

13. A computer program product for moving Open Systems Interconnection (OSI) layer 4 connections seamlessly between a user equipment connected wirelessly to a series of cell-towers, wherein the OSI layer 4 connections are moved from between the user equipment and a first cell-tower from the series of cell-towers to the user equipment and a second cell-tower from the series of cell-towers, wherein an OSI layer 4 connection is extracted out of underlying cellular protocols at said cell-towers, and wherein the computer program product comprises a non-transitory computer readable storage medium having program code embodied therewith, the program code readable and executable by a processor to perform a method comprising:
- detecting that said user equipment has a broken-out layer 4 connection;
- detecting that said user equipment, with the broken-out layer 4 connection, has moved from the first cell-tower to the second cell-tower;
- tunnelling traffic for an existing layer 4 connection from the user equipment between the first cell-tower and the second cell-tower, wherein tunnelling traffic comprises first network address translation (NAT) means at the first cell-tower and second NAT means at a radio network controller (RNC) linking said first and second cell-towers to route IP packets to an appropriate cell-tower, wherein the second NAT means at the RNC map a first network address, used by data network servers for the user equipment, to a second network address, in the first NAT means, that is used by the first and second cell-towers;
- identifying a predetermined trigger event, wherein the predetermined trigger event is a detection of there being no active layer 4 connections proxied at the first cell-tower, wherein proxied active layer 4 connections are proxied in a web cache within a transparent forward proxy in the first cell-tower;
- in response to the predetermined trigger event occurring, migrating an ongoing bidirectional flow of data packets from the user equipment over to layer 4 connections maintained at the second cell-tower; and
- byte caching OSI layer 4 connections for all server ports other than the proxied active layer 4 connections that are proxied in the web cache.

14. The computer program product of claim 13, wherein only traffic for hypertext transfer protocol (HTTP) port 80 is proxied.

15. The computer program product of claim 13, wherein, following the trigger event, the first and second NAT means are adjusted in synchronism.

16. The computer program product of claim 15, wherein the first and second NAT means are adjusted to provide the user equipment with a new IP address associated with the second cell-tower.

17. The computer program product of claim 13, wherein said tunnelling of the traffic uses an overlay network defined between the cell-towers.

18. The computer program product of claim 13, wherein an OSI layer 4 protocol used in the OSI layer 4 connections comprises one of: Transmission Control Protocol (TCP), User Datagram Protocol (UDP), and Stream Control Transmission Protocol (SCTP).

* * * * *